May 25, 1965 L. R. BAYES 3,184,894
PORTABLE TAP VALVE GRINDER
Filed Sept. 23, 1963
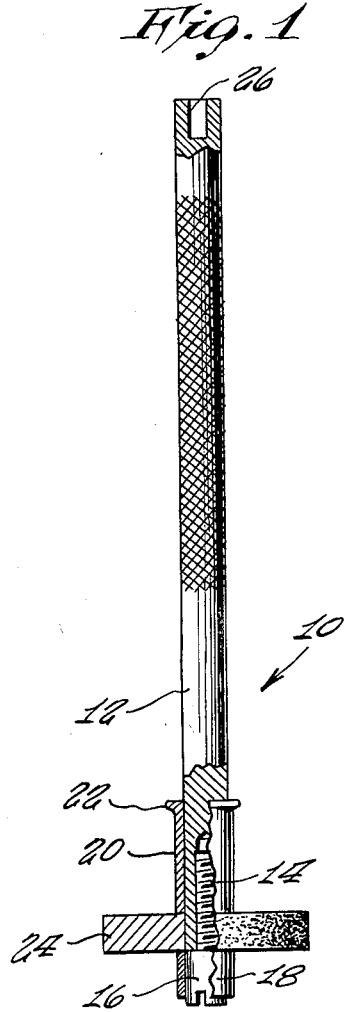
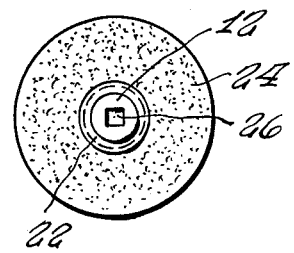
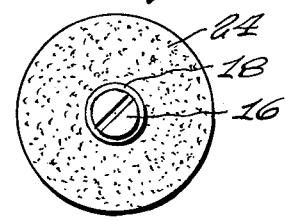
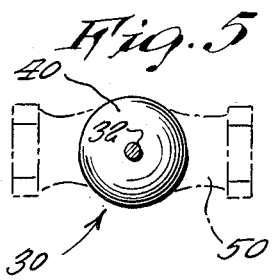
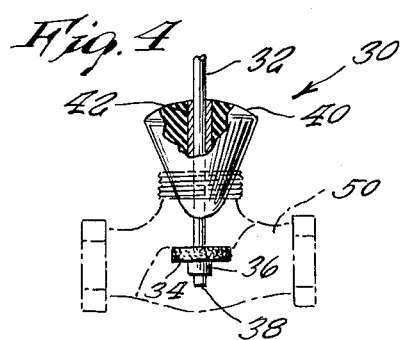
INVENTOR.
LIONEL R. BAYES United States Patent Office 3,184,894
Patented May 25, 1965

3,184,894
PORTABLE TAP VALVE GRINDER
Lionel Roy Bayes, R.R. 3, Salmon Arm,
British Columbia, Canada
Substituted for abandoned application Ser. No. 10,451,
Feb. 23, 1960. This application Sept. 23, 1963, Ser. No. 310,953
3 Claims. (Cl. 51—241)

This invention relates to grinding apparatus and more particularly to a device for grinding tap valves.

It is an object of the present invention to provide a portable tap valve grinder which can be effectively used for grinding the valve seats of house taps in a simple and convenient manner.

Another object of the present invention is to provide a tap valve grinder of the above type which can be readily driven by a power operated hand drill so as to grind such valve seats with a minimum amount of effort.

Other objects of the invention are to provide a portable tap valve grinder bearing the above objects in mind which is of simple construction, has a minimum number of parts, is inexpensive to manufacture and efficient in operation.

For other objects and for better understanding of the invention reference may be had to the following detailed description taken in conjunction with the accompanying drawing, in which:

FIGURE 1 is a side elevational view, with parts broken away, of a portable tap valve grinder made in accordance with one form of the present invention;

FIGURE 2 is a top plan view of the assembly shown in FIGURE 1;

FIGURE 3 is a bottom plan view of the assembly shown in FIGURE 1;

FIGURE 4 is a fragmentary side elevational view, with parts broken away, of a slightly modified form of the present invention in actual use;

FIGURE 5 is a fragmentary top plan view of the assembly shown in FIGURE 4.

Referring now more in detail to the drawing, and more particularly to FIGURES 1 to 3 thereof, a portable tap valve grinder assembly 10 made in accordance with one form of the present invention is shown to include a main shaft 12 having an internally threaded opening 14 at one end within of which a machine screw 16 is threadedly received. The head of the machine screw 16 is provided with an integral sleeve portion 18 which serves as an abutment for pressure engagement with the bottom surface of a grinding wheel 24 detachably carried upon the lower end of the shaft 12. The upper surface of the grinding wheel 24 is in abutment with the sleeve member 20 having a radially outwardly extending bead 22 at its upper-most end. This sleeve 20 serves as a guide for engagement with the bonnet receiving flange of a tap valve 50, so as to center the shaft 12 during the use of the grinding apparatus. Thus, the upper surface of the grinding wheel 24 is driven in contact with the valve seat of the tap valve under the guiding action of the centering sleeve 20 disposed within the bonnet receiving flange of the tap valve. The upper end of the shaft 12 is provided with a rectangular recess 26 within of which an adapter of a power operated portable hand drill may be inserted for driving the grinding wheel 24 in grinding engagement with the valve seat.

With reference now to FIGURES 4 and 5 of the drawing, a slightly modified form of construction 30 is shown wherein the main shaft 32 similarly supports a circular grinding wheel 34 at its lowermost end by means of mounting means including a machine screw 38 and integral sleeve portion 36. A substantially inverted conical shaped plug 40, having an internally mounted sleeve 42, is rotatably carried upon the main shaft 32. Thus, the apex end of the plug 40 may be inserted into the opening defined by the bonnet receiving flange of the valve 50 so as to automatically center the main shaft 32 and the grinding wheel 34 with respect to the valve seat which is being ground. Accordingly, the resilient plug 40 will remain stationary with respect to the valve tap 50, while the sleeve 42 allows rotation of the shaft 32 therewithin under the driving action of a power operated hand drill, in the manner hereinbefore described. The plug 40 thus eliminates the necessity of having to provide a separate sleeve member 20 of the type shown in FIGURES 1 to 3 of the drawing, which must be accurately made to fit the opening through the bonnet of the valve within of which it is seated for guiding the rotation of the main shaft 12.

While various changes may be made in the detail construction it shall be understood that such changes shall be within the spirit and scope of the present invention as defined by the appended claims.

What I claim as new and desire to protect by Letters Patent of the United States is:

1. A portable tap valve grinder comprising in combination a main shaft, said main shaft being knurled over a major central portion thereof, coupling means at one end of said main shaft for connection to a hand drill, a grinding stone, mounting means carried at the opposite end of said main shaft releasably securing said grinding stone thereupon and guide means carried upon said main shaft intermediate said one end and said grinding stone centering said shaft in coaxial relationship with a valve seat of a valve being ground, said coupling means comprising a non-circular recess in one said end of said main shaft for receiving an adaptor of a power operated portable hand drill and said mounting means comprising a machine screw having a sleeve integrally mounted upon the head thereof for abutment with one outer side of said grinding wheel for maintaining said grinding wheel in assembled relationship with said shaft, and said guide means having an outwardly extending head at its end which is opposite the end adjacent said grinding wheel.

2. The combination according to claim 1, wherein said guide means comprises a sleeve rotatably carried upon said main shaft in abutment with the opposite side of said grinding stone, said sleeve being received within the central opening of the valve bonnet for maintaining said grinding wheel in concentric relationship with the valve being ground.

3. A portable tap valve grinder comprising, in combination, a main shaft, said main shaft being knurled over a major central portion thereof, coupling means at one end of said main shaft for connection to a hand drill, a grinding stone, mounting means carried at the opposite end of said main shaft releasably securing said grinding stone thereupon and guide means carried upon said main shaft intermediate said one end and said grinding stone centering said shaft in coaxial relationship with a valve seat of a valve being ground, said coupling means comprising a non-circular recess in one said end of said main shaft for receiving an adaptor of a power operated portable hand drill and said mounting means comprising a machine screw having a sleeve integrally mounted upon the head thereof for abutment with one outer side of said grinding wheel for maintaining said grinding wheel in assembled relationship with said shaft, said guide means comprising an inverted conical shaped plug rotatably carried upon said main shaft, the apex end of said plug being frictionally securable within the opening defined by the bonnet receiving flange of a valve being ground and securing said main shaft and said grinding stone in concentric relationship with the valve seat being ground.

References Cited by the Examiner
UNITED STATES PATENTS

| | | | |
|---|---|---|---|
| 1,088,990 | 3/14 | Hoffman | 51—170.1 |
| 1,862,810 | 6/32 | Stone | 90—12.5 |
| 2,199,726 | 5/40 | Hyde | 51—170.1 |
| 2,933,093 | 5/58 | Shesler | 51—241.1 |
| 2,906,064 | 9/59 | Hale | 51—170.1 |

LESTER M. SWINGLE, *Primary Examiner.*
J. SPENCER OVERHOLSER, *Examiner.*